(12) United States Patent
Boesch et al.

(10) Patent No.: US 6,438,382 B1
(45) Date of Patent: Aug. 20, 2002

(54) EXPEDITED LOCATION DETERMINATION IN ANALOG SERVICE AREAS

(75) Inventors: Ronald D. Boesch, Morrisville; Havish Koorapaty; Leland S. Bloebaum, both of Cary, all of NC (US)

(73) Assignee: Telefonaktiebolaget LM Ericsson (Publ.), Stockholm (SE)

( * ) Notice: Subject to any disclaimer, the term of this patent is extended or adjusted under 35 U.S.C. 154(b) by 39 days.

(21) Appl. No.: 09/782,844

(22) Filed: Feb. 14, 2001

(51) Int. Cl.[7] ................................................ H04Q 7/20
(52) U.S. Cl. ..................................... 455/456; 342/357.1
(58) Field of Search ......................... 342/357.1; 455/456

(56) References Cited

U.S. PATENT DOCUMENTS

| | | | | |
|---|---|---|---|---|
| 5,669,061 A | * | 9/1997 | Schipper | 342/357.1 |
| 6,166,685 A | * | 12/2000 | Soliman | 342/357.1 |
| 6,191,737 B1 | * | 2/2001 | Havinis et al. | 342/450 |
| 6,249,245 B1 | * | 6/2001 | Watters et al. | 342/357.03 |
| 6,323,805 B1 | * | 11/2001 | Zou et al. | 342/357.09 |

* cited by examiner

Primary Examiner—Daniel Hunter
Assistant Examiner—Alan T. Gantt
(74) Attorney, Agent, or Firm—Coats & Bennett, P.L.L.C.

(57) ABSTRACT

A mobile terminal uses stored GPS data to expedite position determination when placing emergency calls. The mobile terminal receives supporting GPS data such as almanac and ephemeris information from a supporting digital wireless network when digital service is available. When operating in an analog service area where GPS data is not available from the analog wireless network, the mobile terminal uses GPS data previously received in a digital service area, unless that data is too old to be useful. Additionally, the mobile terminal can periodically update its stored GPS data while in standby in an analog service area, based on receiving the needed data directly from available GPS satellites. The mobile terminal or digital wireless network may automatically update GPS data stored in the mobile terminal based on the age of stored data, or based on the probability of moving into an analog service area.

29 Claims, 6 Drawing Sheets

EXPEDITED LOCATION DETERMINATION IN ANALOG SERVICE AREAS

BACKGROUND OF THE INVENTION

The present invention generally relates to wireless communication systems and particularly relates to determining a present location of a wireless mobile terminal.

Wireless technology progresses continuously, with newer technologies providing increased user capacity, improved quality of service, and new user convenience features. With enhanced data services, many newer mobile terminals allow users to send and receive email, as well as browse the World Wide Web. Some newer convenience features depend on the ability to determine a mobile terminal's physical location. For example, the ability to determine mobile terminal location has commercial value with regard to targeted or location-sensitive advertising. However, the need to accurately determine the present physical location of a given mobile terminal extends beyond considerations of commerce and convenience.

In emergency situations, the ability to quickly determine a mobile terminal user's physical location can be a matter of life-and-death. Knowing where one is at precisely enough to provide meaningful directions is challenge enough, even absent the duress of an emergency situation. For emergency services personnel to receive reliable location information, location data must come from the wireless communication system, the mobile terminal itself, or some combination thereof. In the United States, these concerns over the need to quickly locate mobile terminal users in emergency situations have sparked legislation imposing requirements on wireless service providers to field wireless communication systems that provide mobile terminal locating capabilities.

While several techniques exist for determining mobile terminal location, including approaches based on radio signal time-of-arrival between a given mobile terminal and multiple base stations, techniques based on the Global Positioning System (GPS) offer perhaps the most straightforward approach for reliably determining positions to within 100 meters or less. Consequently, an increasing number of mobile terminals include GPS functionality, enabling theses terminals to use GPS satellite signals to determine their current geographic location with relatively high precision.

A GPS-equipped mobile terminal may operate similar to recently popularized hand-held navigation units that provide current geographic location based on processing GPS satellite signals. That is, a GPS-equipped mobile terminal uses precise information about GPS satellite positions and GPS system time to derive its current geographic position. To determine position accurately requires detailed information about the orbits and positions of the GPS satellites. Because of the low communication bandwidth of the GPS signal, initially receiving and subsequently updating this GPS data from the GPS satellites is a lengthy process. While such delays are tolerable in conventional GPS navigation units, such delays are not acceptable in the context of emergency calling from a mobile terminal.

BRIEF SUMMARY OF THE INVENTION

The present invention provides a system and method to reduce the time required for determining a mobile terminal's geographic position in, for example, emergencycalling situations. To reduce the time required for determining the mobile terminal's position at the outset of a call, the mobile terminal maintains stored position assistance data, such as GPS data, that expedites GPS satellite signal acquisition and processing. In an analog service area, the mobile terminal may periodically update stored GPS data using information received from available GPS satellites. In a digital service area, the mobile terminal typically preferably receives the supporting GPS data from the supporting wireless communication network rather than from the GPS satellites. If the mobile terminal obtains GPS data while operating in a digital service area, it can later use this data in an analog service area to expedite position determination, provided the data has not aged too much to be useful.

The position assistance data stored in the mobile terminal typically includes GPS almanac, ephemeris, clock and ionosphere corrections, and timing and location references. Wireless communication networks based on digital communication standards, such as TIA/EIA-136, IS-95, and GSM, include provisions for transmitting data, which may include position assistance data, to mobile terminals during standby conditions. However, analog standards, such as AMPS, typically do not include this capability,. Additionally, the bandwidth available on analog channels, both voice and control, is low as compared to the digital communication standards. In many areas it is likely that the operator of the wireless communication system will not deploy the provision of GPS assistance data on analog channels.

To fully exploit opportunities for using position assistance data already stored in the mobile terminal for position determination in analog service areas, GPS data should be periodically refreshed via the supporting wireless communication network while the mobile terminal operates within a digital service area. Alternatively, either the mobile terminal or the wireless network can predict when a move into an analog service area is likely, and update needed portions of the GPS data in response. In this manner, if the mobile terminal subsequently moves into the analog service area, it does so with substantially current GPS data. The advantage of this is faster acquisition of the satellite signals and computation of a position, thereby reducing the power consumption and improving the quality of service provided by the mobile terminal.

DETAILED DESCRIPTION OF THE INVENTION

The present invention is directed to ensuring that a mobile terminal maintains current position assistance data so that the time required to determine its geographic position on demand is reduced. This expedited location determination capability has particular value in emergency calling situations. Techniques for maintaining current position assistance data within the mobile terminal include approaches best suited to operation in digital cellular service areas, analog cellular service areas, and in mixed digital and analog cellular service areas. As such, the following discussion generally applies to the broad division between analog and digital wireless communication services, rather than to specific wireless communications air interface standards, except where noted.

Examples of prevailing digital communication standards include TIA/EIA-136, which defines digital cellular and data services at 800 MHz and 1900 MHz, and is based on Time Division Multiple Access (TDMA) techniques. Other examples of digital air interface standards include but are not limited to IS-95, cdma2000, and Global System for Mobile Communications (GSM). The cdma2000 standard provides for digital cellular and data services at one or more frequency bands and is based on Code Division Multiple Access (CDMA) techniques. The GSM standard also provides for digital cellular and data services, and defines operation at a variety of frequency bands depending upon locality. Developing third-generation (3G) standards incorporate aspects of one or more of these existing digital standards.

The Advanced Mobile Phone System (AMPS) standard is perhaps the most prevalent analog cellular service standard. While AMPS is often considered a legacy system, it nonetheless enjoys broad deployment and remains the only available service in many geographic locations.

Figure 1:
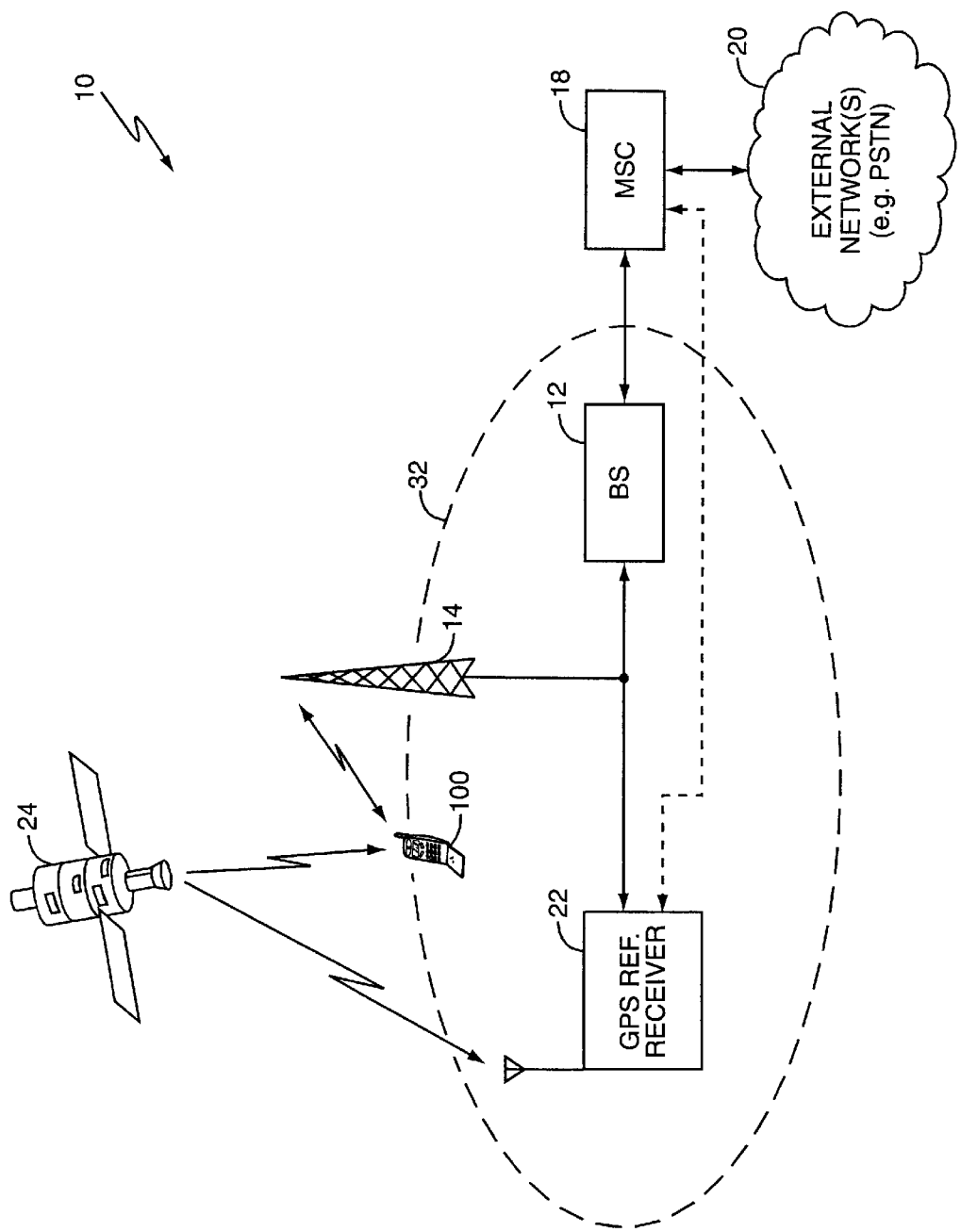
FIG. 1 is a diagram of a digital mobile network providing GPS data to mobile terminals in accordance with the present invention.

Referring now to the FIG. 1, a mobile network 10 includes at least one base station 12 and associated radio antenna 14, that together define a wireless communication service area 16 to support one or more mobile terminals 100, a mobile switching center 18 to interface with one or more external networks 20, and one or more GPS reference receivers 22. The base station 12 uses its associated antenna 14 to communicate with the mobile terminals operating in the service area 16. The mobile switching center 18 typically supports a number of base stations 12, and provides a communication interface between the mobile network 10 and the one or more external networks 20.

The mobile terminal 100 maintains updated position assistance data, which may include GPS satellite position and time information, so that it can rapidly calculate its geographic position when necessary. While the mobile terminal 100 may have full GPS reception capabilities, the GPS data needed to ensure quick and accurate calculations of position may be more conveniently provided by the mobile network 10 rather than by the GPS satellites themselves. TIA/EIA-136, for example, provides for messaging, paging, and other data transfers, such as general broadcast messages, between the base station 12 and the mobile terminals 100 operating within the digital service area 16. The mobile terminals 100 typically receive such data when operating in an idle or standby condition. Thus, the GPS data required for supporting rapid GPS satellite signal acquisition and accurate position calculations may be provided to one or more mobile terminals 100 by the base station 12.

The mobile network 10 may provide position assistance data generally on a broadcast basis. In this framework, mobile terminals 100 that are "camping" on digital control channels within the digital service area 16 receive position assistance data on defined broadcast channels, such as the Extended Broadcast Channel (E-BCCH) defined in the TIA/EIA-136 standard. In other frameworks, dedicated or terminal-specific communication channels might be used to provide position assistance data or updates to selected mobile terminals 100 in the digital service area 16.

The mobile network 10 has access to the requisite GPS data via the GPS reference receiver 22. Other systems within the mobile network 10 may generate position assistance data based on information from the reference receiver 22, which is then sent to the base station 12 for transmission to a mobile terminal 100, or the base station 12 may itself process the GPS data. Note that the reference receiver 22 may be located elsewhere within the mobile network 10, such as at a location server (not shown).

The GPS reference receiver 22 uses information received from the available GPS satellites 24 to maintain continuously updated GPS data. This updated GPS data serves as the basis for updated position assistance data available to the mobile terminals 100. All or selected portions of this position assistance data may be transferred to the mobile terminal 100 on demand or as needed. The GPS data of interest includes but may not be limited to almanac, ephemeris, clock and ionosphere corrections, and reference time and reference location information.

Almanac data includes specific orbital parameters for each of the GPS satellites 24 in the constellation of GPS satellites 24. Almanac data represents a coarse model of the satellite positions and is typically good for about a month. The satellite position errors introduced by outdated almanac degrade gracefully as the data becomes increasingly aged. Ephemeris data represents a precise model of a given GPS satellites' position, and is presented using Keplerian orbital elements. The elements include the semi-major axis, the orbital eccentricity, the orbital inclination, the ascending node, the argument of the perigee, and the time of the perigee.

Ephemeris data is vital for determining the precise relative position of each GPS satellite 24 used by the mobile terminal 100 in position determination. In addition to ephemeris data, satellite clock correction model and ionosphere corrections are needed for precise positioning. The propagation time of the GPS satellite signals through the ionosphere varies as a function of the total electron count in the ionosphere, which in turn varies over time. The ephemeris and clock correction data for any given GPS satellite 24 is valid for two to four hours. The ionosphere delay corrections are globally valid for up to six days, which is the maximum time between uploads from the GPS ground stations (not shown) to the GPS satellites 24.

Finally, the position assistance data stored in the mobile terminal 100 can include reference time and location data. The reference time is an estimate of the current GPS time, and may be stored in the form of a real-time clock (RTC) that is initialized by data from the network 10 but subsequently runs autonomously. The reference location is a representation of the approximate current location of the mobile terminal 100. Generally, the reference location is desired to be accurate to within 100 km of the mobile terminal's current position.

As earlier noted, the mobile terminal 100 receiving the above GPS data from the mobile network 10 rather than directly from the available GPS satellites 24 is advantageous. First, the mobile terminal 100 saves power by receiving the GPS data through its radio link with the base station 12, since it already monitors that communications channel while in standby. This eliminates the need to expend additional power receiving and processing the GPS satellites signals. Second, the data bandwidth for signaling between the base station 12 and the mobile terminal 100 is substantially higher than the data bandwidth of the GPS satellite signals. For example, receiving the full almanac data via a GPS satellite signal may require in excess of ten minutes, while the mobile terminal 100 can receive the same data via the mobile network 10 in a few seconds.

The underlying point of maintaining current position assistance data is that, if the mobile terminal has substantially current GPS data stored, it takes relatively little time for it to acquire necessary satellite signals and to calculate its current geographic position. Indeed, having regularly updated position assistance data available enables the mobile terminal 100 to determine its position in situations where such determination would not otherwise be possible. To understand this, there are a few points worth noting about determining current location based on GPS, and about the GPS satellite signals themselves.

Generally, signals from three separate GPS satellites 24 are required for determining a two-dimensional location on the earth's surface, with a fourth GPS satellite signal required to determine altitude above the surface. Each GPS satellite 24 transmits its Standard Position Service signal (SPS), the signal available for civilian use, using spread spectrum techniques. To receive the signal from a given GPS satellite 24, the mobile terminal 100 must de-correlate the received signal using the same pseudo-noise (PN) spreading code employed by the GPS satellite 24. The mobile terminal 100 must adjust the code phase offset of its locally generated PN code to match the code phase offset of the received signal. When the code phase offset is matched to the received signal, a correlation peak is generated. In this manner, the mobile terminal 100 can detect when it has aligned its locally generated PN code with that of the received signal. This process of resolving sub-millisecond ambiguity is known as "code acquisition." The receiver also must resolve larger time ambiguities, such as the millisecond within the 20-ms bit and the bit within the navigation message, prior to computing the positions of the satellites 24 and itself. This entire process is known as "synchronization".

Synchronization must be achieved for each of the three (or four) GPS satellite signals being received by the mobile terminal 100. Because the code phase offset of each received signal depends upon the signal's time-of-flight, the mobile terminal 100 can infer the distance to the originating GPS satellite 24 after synchronization. Thus, by synchronizing with the GPS satellite signals of interest the mobile terminal 100 can quickly determine its distance from each of the involved GPS satellites 24 with a high degree of accuracy. In turn, this allows the mobile terminal 100 to determine its own geographic position. Significantly, if the stored GPS data is accurate enough (i.e., current enough), the mobile terminal 100 can make its position determination based on the synchronization process alone, without the need for actually demodulating the received GPS satellite signals to recover their embedded data.

GPS satellite signals are inherently low power and lack robust forward-error encoding. Consequently, under anything approaching marginal reception conditions, the bit-error-rate (BER) of data extracted from the signals can be quite high. The received signal strength required for successful synchronization is lower than that required for successful demodulation and data extraction. Thus, the mobile terminal 100 can determine its position based on synchronization and stored GPS data in areas where the BER of received GPS data would be too high for successful location determination.

Figure 2:
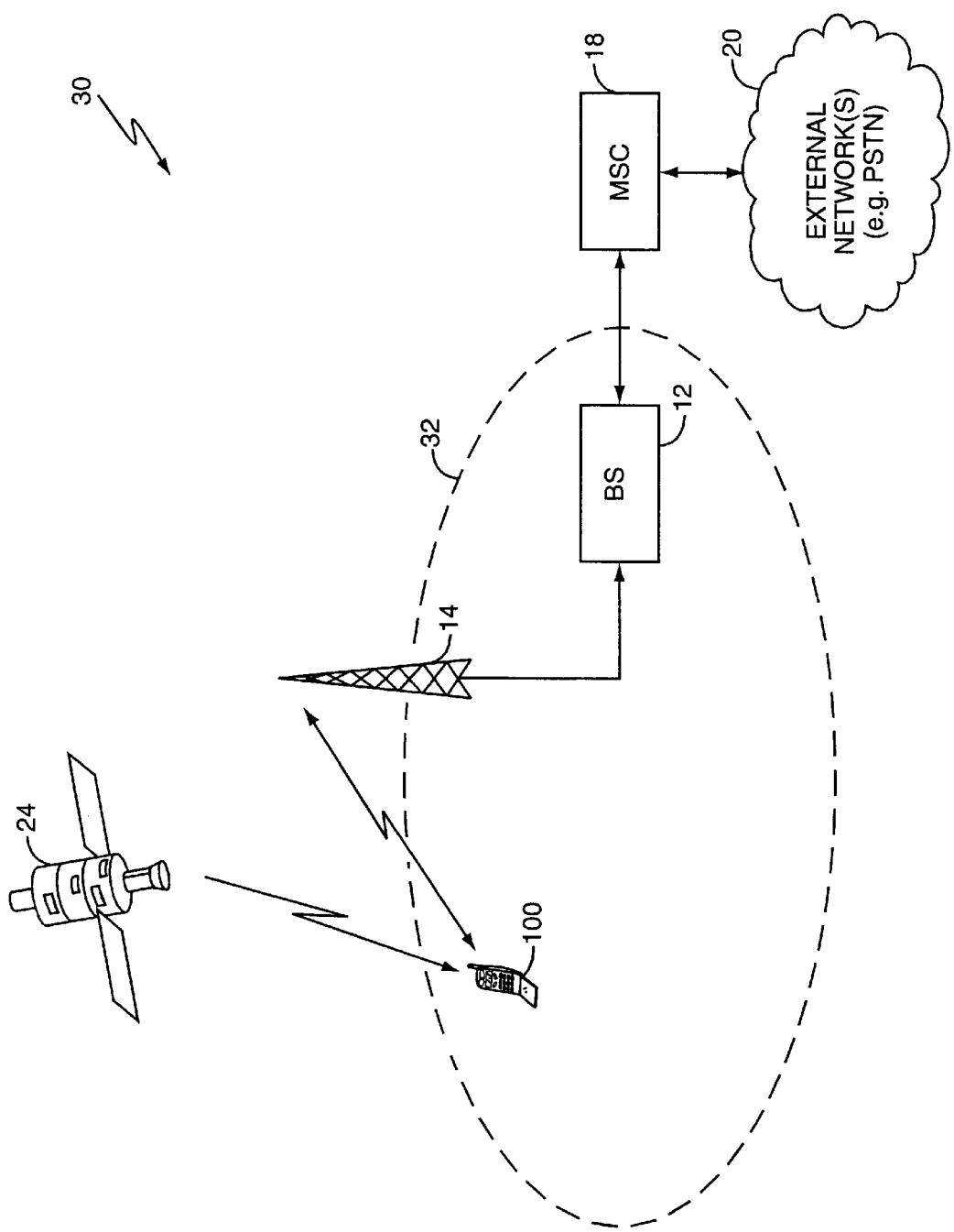
FIG. 2 is a diagram of an analog mobile network.

Turning now to FIG. 2, a mobile network 30 includes a base station 12 and associated antenna 14, together defining an analog service area 32. The mobile network 30 further includes an MSC 18 to interface the mobile network 30 with one or more external networks 20. For this discussion, the primary distinction between the mobile network 30 and the earlier mobile network 10 is that the mobile network 30 is based on an analog air interface standard, such as AMPS. The general functionality of the base stations 12 and mobile switching centers 18 is similar with that of their counterparts in the mobile network 10. However, there are no provisions for the mobile network 30 to provide the mobile terminal 100 with GPS data while it is in standby mode. Therefore, the mobile terminal 100 has no opportunity to receive network-assisted GPS data during operation in the analog service area 32.

When operating in the analog service area 32, there are essentially two possibilities for having stored GPS data within the mobile terminal 100 that is recent enough to be of value in expediting position determination. First, the mobile terminal might have recently moved from the digital service area 16, such that the GPS assistance data it received earlier remains sufficiently useful. Second, the mobile terminal 100 can acquire and maintain the needed GPS data, based on receiving the data directly from the available GPS satellites 24. The second approach has several challenges.

GPS satellite signals are low power and require significant signal amplification. The structure of the mobile terminal 100 is discussed in more detail later, but at present it suffices to state that the mobile terminal 100 typically cannot successfully receive and demodulate the satellite signals while its own transmit signal is active. It should be noted that the mobile terminal 100 transmits and receives in half-duplex fashion when operating in the digital service area 16, and in full-duplex fashion when operating in the analog service area 32. This simply means that in the digital service area 16, the mobile terminal's transmitter is off when its receiver is on during an active call, but is continuously on during an active call in the analog service area 32.

The above fact highlights one of the reasons for maintaining current GPS data in the mobile terminal 100. If the mobile terminal 100 cannot receive GPS satellite signals while actively transmitting, then the transmit signal must not be enabled at the outset of an emergency phone call from the analog service area 32 until the mobile terminal 100 has determined its location. The delay from initiation of the emergency call associated with position determination must be minimal. With substantially current GPS data available in the mobile terminal 100, an accurate location can be determined much more quickly than if the data were not available. In some instances, position determination time may be reduced to within a few seconds or less.

Figure 3:
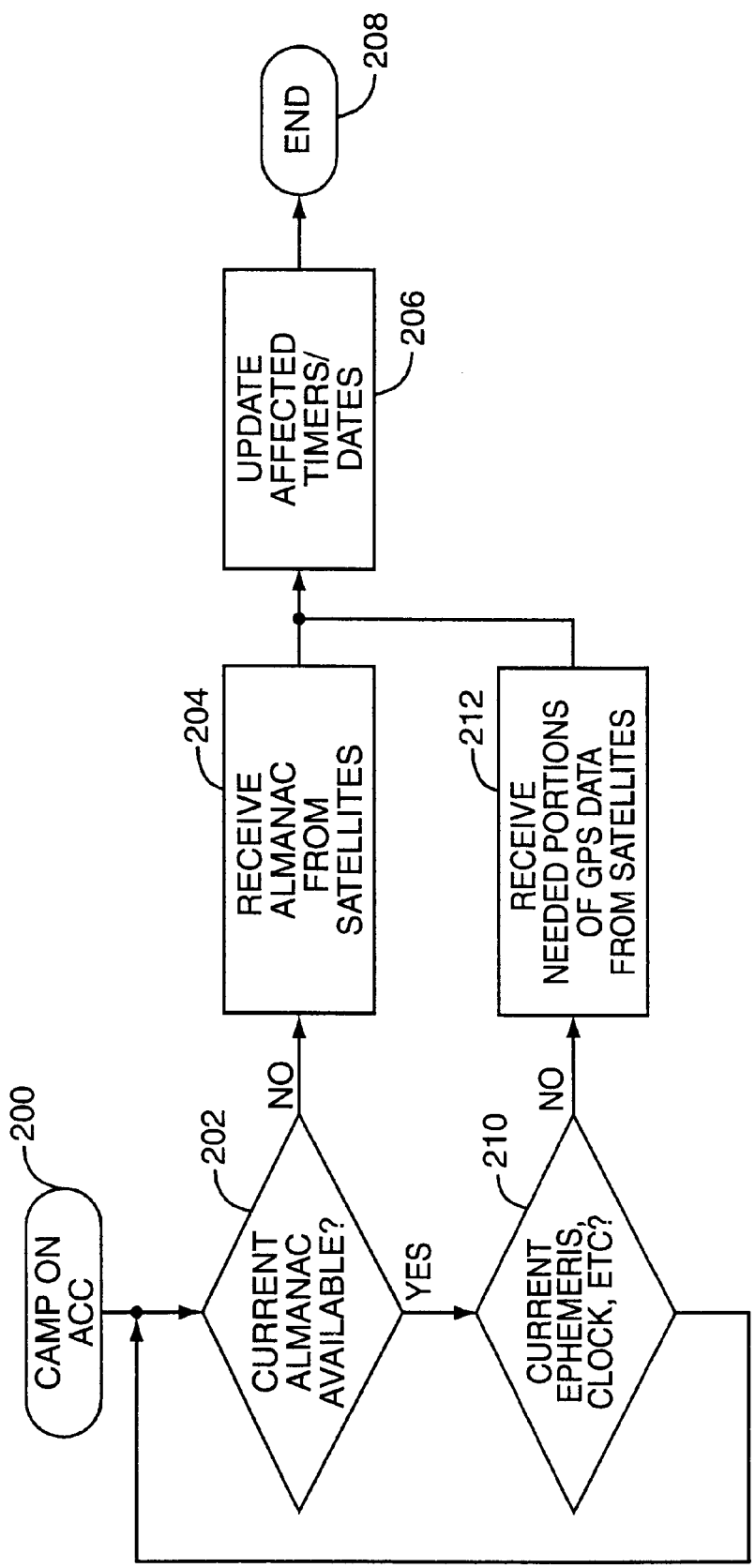
FIG. 3 is a flow diagram for obtaining and maintaining mobile terminal GPS data while operating in an analog service area.

If the GPS data, or selected portions thereof, stored in the mobile terminal is too old to be useful in accurate position determination, the mobile terminal 100 can periodically receive needed portions of the GPS data from the available GPS satellites 24. FIG. 3 provides simplified flow logic for this process.

Processing begins with the mobile terminal 100 camping on an ACC (block 200). If the mobile terminal 100 does not contain current almanac data (block 202), it receives the needed information from one of the currently available GPS satellites 24. The mobile terminal 100 then updates any affected timers or stored date values to reflect its reception of the updated almanac information (block 206), and processing ends. Note that indicating the end of processing does not imply that the mobile terminal 100 ends camping on the ACC, but rather marks a logical termination of the current GPS-related processing task or thread.

If the mobile terminal 100 already has current almanac data, it checks to see if any of the more time-sensitive GPS data needs refreshing (block 210). This data includes the ephemeris data, as well as the ionosphere and clock correction data. The mobile terminal might set up internal timers such that it checks the age of stored GPS data once every five minutes, or other reasonable time interval. If one or more portions of the remaining GPS data needs updated, the mobile terminal 100 receives the needed data from relevant GPS satellites 24 (block 212). The mobile terminal 100 stores this data internally, and may time-stamp the data or simply note the time of last updating for the various portions of the GPS data so that it can track when future updates are needed.

With the processing above, the mobile terminal 100 maintains current GPS data while operating in the analog service area 32. Because the standby current consumed by the mobile terminal 100 while camping on an ACC is substantially higher than when camping on a DCCH, the additional current used by periodically receiving and processing the GPS satellite signals is relatively insignificant. This difference principally arises from differences in how the mobile terminal 100 monitors an ACC versus how it monitors a DCCH. For example, a typical DCCH camping current might be less than three milliamps, while a typical ACC camping current is typically an order of magnitude greater. Thus, a few extra milliamps on average to periodically perform the GPS satellite signal processing is not significant in analog camping.

If the mobile terminal 100 operates in the digital service area 16 and then moves into the analog service area 32, its stored GPS data will remain usable until the most time sensitive portions of that data become too old. Obviously, the usefulness of stored GPS data is maximized if the most time-sensitive or the oldest portions are updated just as the mobile terminal 100 leaves or is about to leave the digital service area 16.

Figure 4:
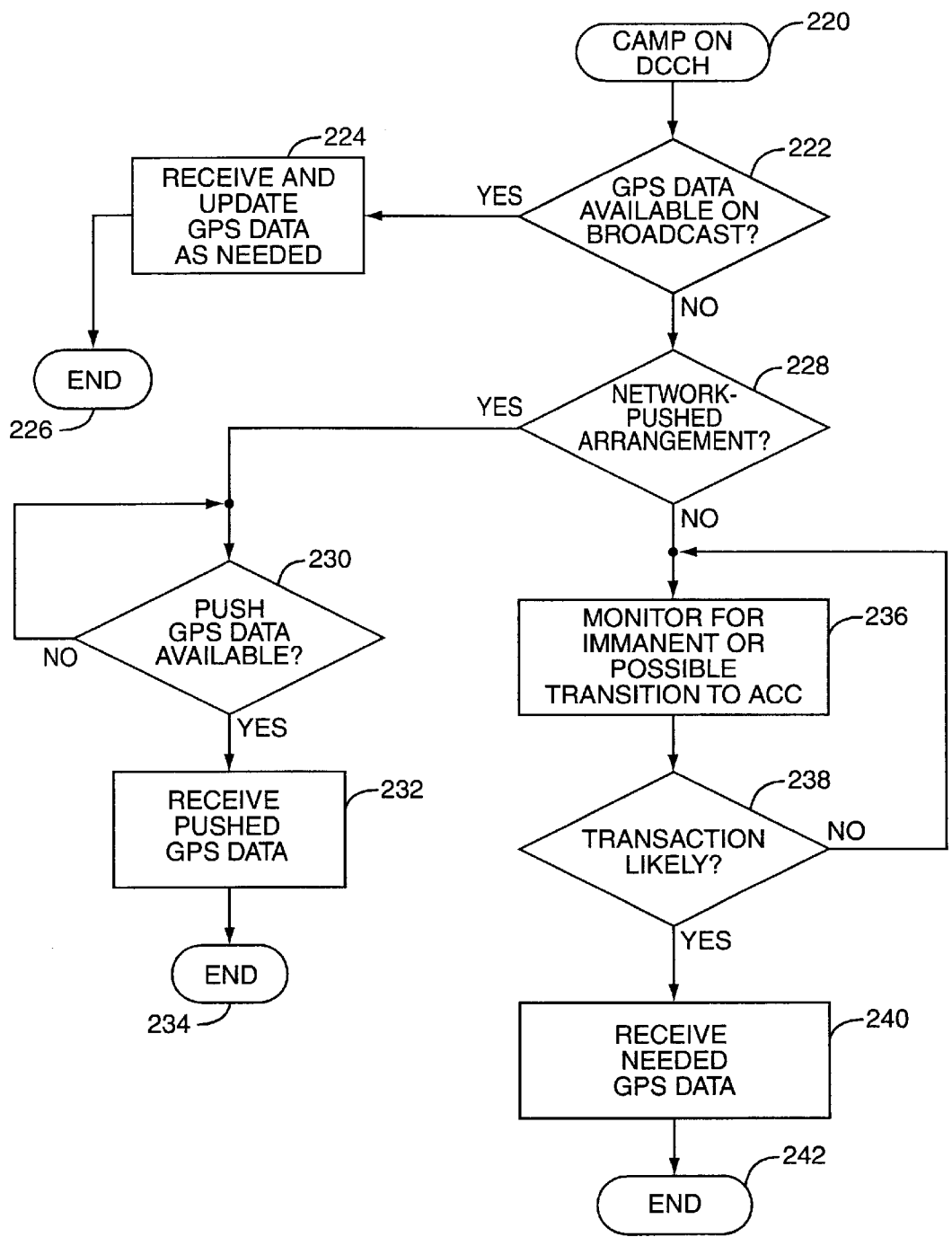
FIG. 4 is a flow diagram illustrating possible approaches to obtaining and maintaining mobile terminal GPS data in a digital service area.

FIG. 4 provides simplified flow logic for a generalized approach to keeping the GPS data stored in the mobile terminal 100 updated while it operates in the digital service area 16. At least three generalized approaches exist for providing network-assisted GPS data to the mobile terminal 100 in anticipation of its subsequent movement to one or more analog service areas. These different approaches are generally illustrated in FIG. 4.

Processing begins with the mobile terminal 100 camping on a DCCH (block 220). In some digital service areas 16, system operators responsible for administering the mobile network 10 might choose to make network-assisted GPS data available on a general broadcast basis to all mobile terminals 100 operating within the digital service area 16. If needed GPS data is available on a general broadcast basis (block 222), the mobile terminal 100 may simply receive periodically updated GPS data through the defined broadcast channels, such as the FBCCH and EBCCH defined for TIA/EIA-136 (block 224).

To facilitate updating operations, the mobile terminal 100 might maintain several timers keyed to the time-sensitivity of various portions of the GPS data. For example, the mobile terminal 100 could set an internal timer to trigger re-storage of ephemeris data once every two hours. Once the mobile terminal 100 has updated all or selected portions of its stored GPS data, processing ends (block 226). Here, "ending" may simply constitute returning to the camping state (block 220) or carrying other functions as needed.

If the mobile network 10 does not provide network-assisted GPS data on a general broadcast basis (block 222), it might provide such data to selected mobile terminals 100 on a targeted, point-to-point basis. As such, providing GPS data might represent a premium service that mobile terminal users could subscribe to. If the mobile network 10 is adapted to "push" needed GPS data to specific mobile terminals 100 (block 228), the mobile terminal 100 might simply monitor for such data (block 230). Note that while monitoring, the mobile terminal 100 is still free to carry out other functions. If pushed data is available (block 230), the mobile terminal 100 updates its stored GPS data accordingly (block 232), and processing ends (block 234). Note that the mobile network 10 might push selected portions of the GPS data, or might simply transfer all of it. The mobile terminal 100 might indicate which portions of its stored GPS data are the closest to being out of date and make selective requests on that basis.

In the above scenario, the mobile network 10 might be configured to push the GPS data based on recognizing when various mobile terminals 100 are most likely to leave the digital service area 16. For example, the digital service area 16 might be subdivided into a plurality of service cells (not shown), with each cell having a base station 12 and antenna 14 to provide service to mobile terminals 100 within that cell. When a given mobile terminal 100 enters a cell on the fringe of the digital service area 16, the mobile network 10, perhaps in the MSC 18, might deem that mobile terminal 100 as "likely" to depart the digital service area 16. On that basis, the base station 12 serving the given mobile terminal 100 could transmit the needed GPS data to that mobile terminal 100.

If the mobile network 10 is not configured for selecting pushing of the GPS data (block 236), the mobile terminal 100 might monitor for conditions when it is likely or imminent that it will leave the digital service area 16 (block 236). How the mobile terminal 100 monitors for this condition can depend upon the air interface standard on which the mobile network 10 is based. This concept is illustrated later in more detail using the TIA/EIA-136 standard as an example. If the mobile terminal 100 determines that it is likely or possible that it subsequently move into an analog service area (block 238), such as the analog service area 32, it receives at least the needed portions of its stored GPS data from the mobile network 10 (block 240) to ensure that its stored GPS is as current as possible in anticipation of the transition to analog service. Processing then ends (block 242). As above, "ending" here might simply mean continuation of camping, or performing other functions as needed.

The above discussion of flow logic might not be implemented as a whole within the mobile terminal 100, but does provide an overview of some of the options available for providing network-assisted GPS data to the mobile terminal 100. For example, as standards develop for providing network-assisted GPS data, it becomes more practical to include program functionality within the mobile terminal 100 directed to supporting the specifics of those standards. One example of a developing standard for network assisted GPS data is Part 740 of the TIA/EIA-136 standard. Part 740 defines a network-assisted approach to providing GPS data referred to as System Assisted Mobile Positioning via Satellite (SAMPS). The TIA/EIA-136 standard, including Part 740, is incorporated herein by reference.

Figure 5:
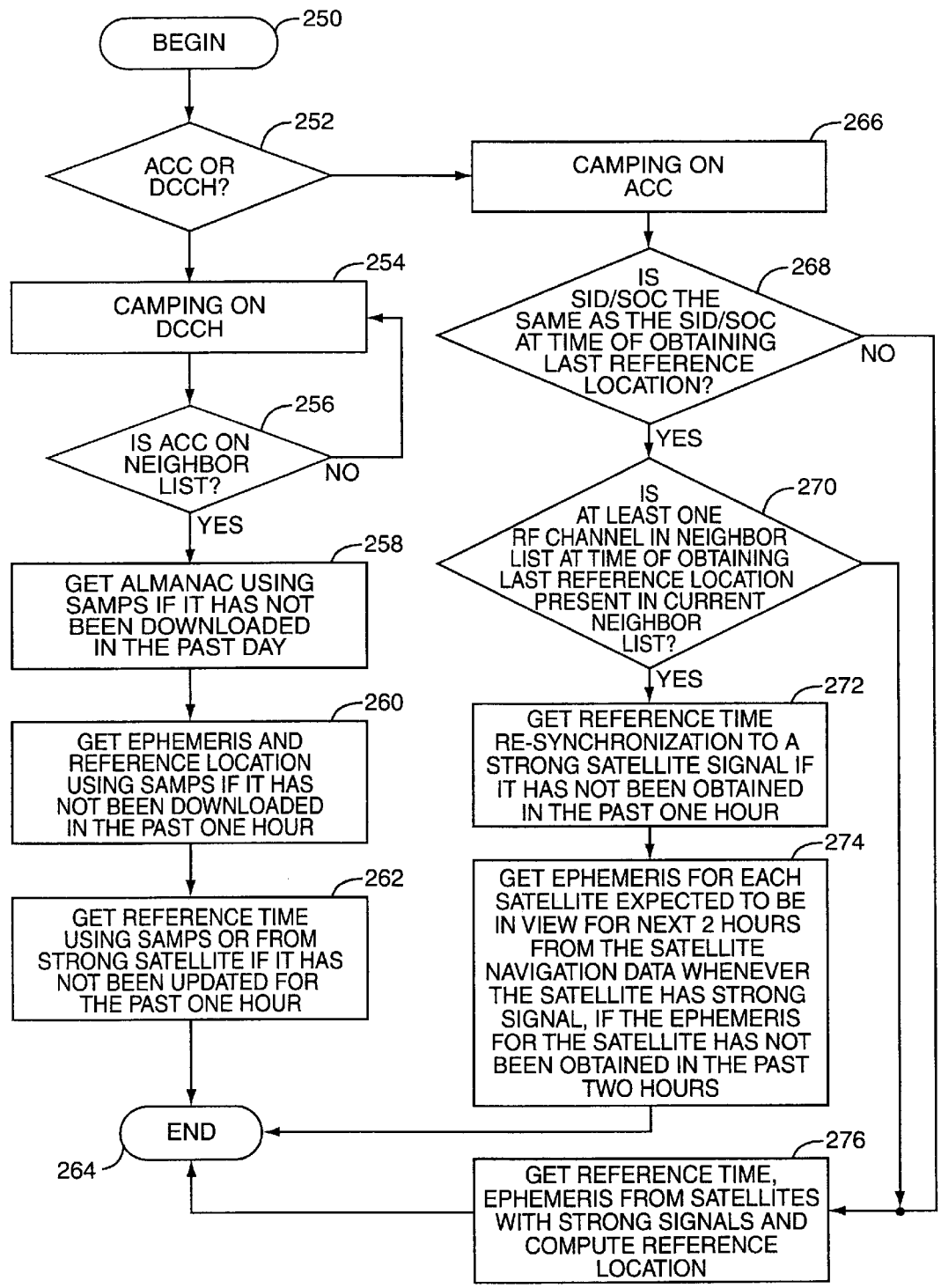
FIG. 5 is a flow diagram illustrating a technique for obtaining and maintaining mobile terminal GPS data in both TIA/EIA-136 and AMPS service environments.

FIG. 5 illustrates one example of mobile terminal operation when the digital service area 16 provides service based on the TIA/EIA-136 standard. Processing begins (block 250) with the mobile terminal 100 determining whether it is camping on an ACC or on a DCCH (block 252). If it is on a DCCH (block 254), the mobile terminal 100 monitors to see whether an ACC appears in the "neighbor list" defined by the TIA/EIA-136 standard. Neighbor lists are maintained in the mobile terminal 100 and indicate neighboring base stations 12 adjacent to the current operating area of the mobile terminal 100 (e.g., the digital service area 16). If there is no analog neighbor, i.e., ACC in the neighbor list (block 256), the mobile terminal continues monitoring its neighbor list (block 254). If an ACC appears in the neighbor list, the mobile terminal 100 gets GPS almanac data via SAMPS, if its has not already updated its almanac for that day (block 258).

The mobile terminal 100 then gets GPS ephemeris and reference location data via SAMPS, if that data has not been downloaded in the past half hour, or some other reasonably short period of time (block 260). Recall that the ephemeris data it generally good for no more than four hours, so the mobile terminal 100 should implement a relatively short timer for updating ephemeris data via SAMPS. Next, the mobile terminal 100 gets reference time data either from the mobile network 10 via SAMPS, or from a strong GPS satellite signal, if the reference time has not been updated within the past one hour, or other reasonable interval (block 264), and processing ends (block 264). The end of processing here might simply represent the mobile terminal 100 returning its initial camping state (block 250), or carrying out other functions as needed. The mobile terminal 100 can maintain one or more internal timers in either hardware or software to manage the above periodic refreshing of the various components of the stored GPS data.

If the mobile terminal 100 finds itself in a camping state on an ACC (block 266), it determines if the System Identification (SID) or System Operator Code (SOC) is the same at when it last obtained its reference location (block 268). If not, the mobile terminal has moved from one analog service area to another. Based on this, the mobile terminal 100 gets the reference time and ephemeris from available GPS satellites with strong signals and computes its reference location (block 276). If the SID or SOC indicates that the mobile terminal 100 has remained in the same analog service area (block 268), it determines if at least one RF channel appearing in its current neighbor list is the same as when it last obtained its reference location (block 270). If not, the mobile terminal 100 has possibly moved a substantial distance relative to its previous reference location. Thus, the mobile terminal 100 updates its reference time and ephemeris data, preferably using the strongest of the currently available GPS satellite signals (block 276). With this update information, the mobile terminal 100 computes its new reference location.

If at least one RF channel appearing in the mobile terminal's current neighbor list is the same as when it last obtained its reference location, the mobile terminal 100 re-synchronizes its reference time using one of the currently available GPS satellite signals if it has not done so in the last hour (block 272). The mobile terminal 100 may use an internal hardware of software timer to track when updates are due for the reference time and other parameters in its stored GPS data. When re-synchronizing its reference time, the mobile terminal 100 preferably using the strongest of the available GPS satellite signals.

The mobile terminal 100 then gets ephemeris for each GPS satellite expected to be in view within the next two hours, if it has not collected such ephemeris data within the last two hours, or other reasonable timing interval (block 274). At this point, processing ends (block 276). As above, the end of processing may simply represent a return to the beginning of logical processing (block 250), and leaves the mobile terminal 100 free to repeat the above logical steps, and perform other functions as needed. Indeed, the operating program of the mobile terminal 100 may be configured such that the mobile terminal 100 performs the above logic in parallel with other functions.

In general, the goal is to maintain the currency of GPS data stored in the mobile terminal 100 using network assistance where available, or by periodic reception of GPS data directly from currently available GPS satellites. The latter technique is employed in analog service areas where network assistance is not available. Note that the mobile terminal 100 may also obtain position assistance data from analog mobile networks that provide such data on one or more voice or control channels. The preceding discussion provided examples for obtaining needed GPS data while operating within a digital service area 16 based on its general availability via broadcast channels, or per mobile terminal 100 as needed a push basis (e.g., initiated by the mobile network 10), or a pull basis (e.g., initiated by the mobile terminal 100). While more detailed examples were provided for TIA/EIA-136 networks, the ideas and techniques discussed above are broadly applicable to existing and planned digital and analog wireless communication standards.

Figure 6:
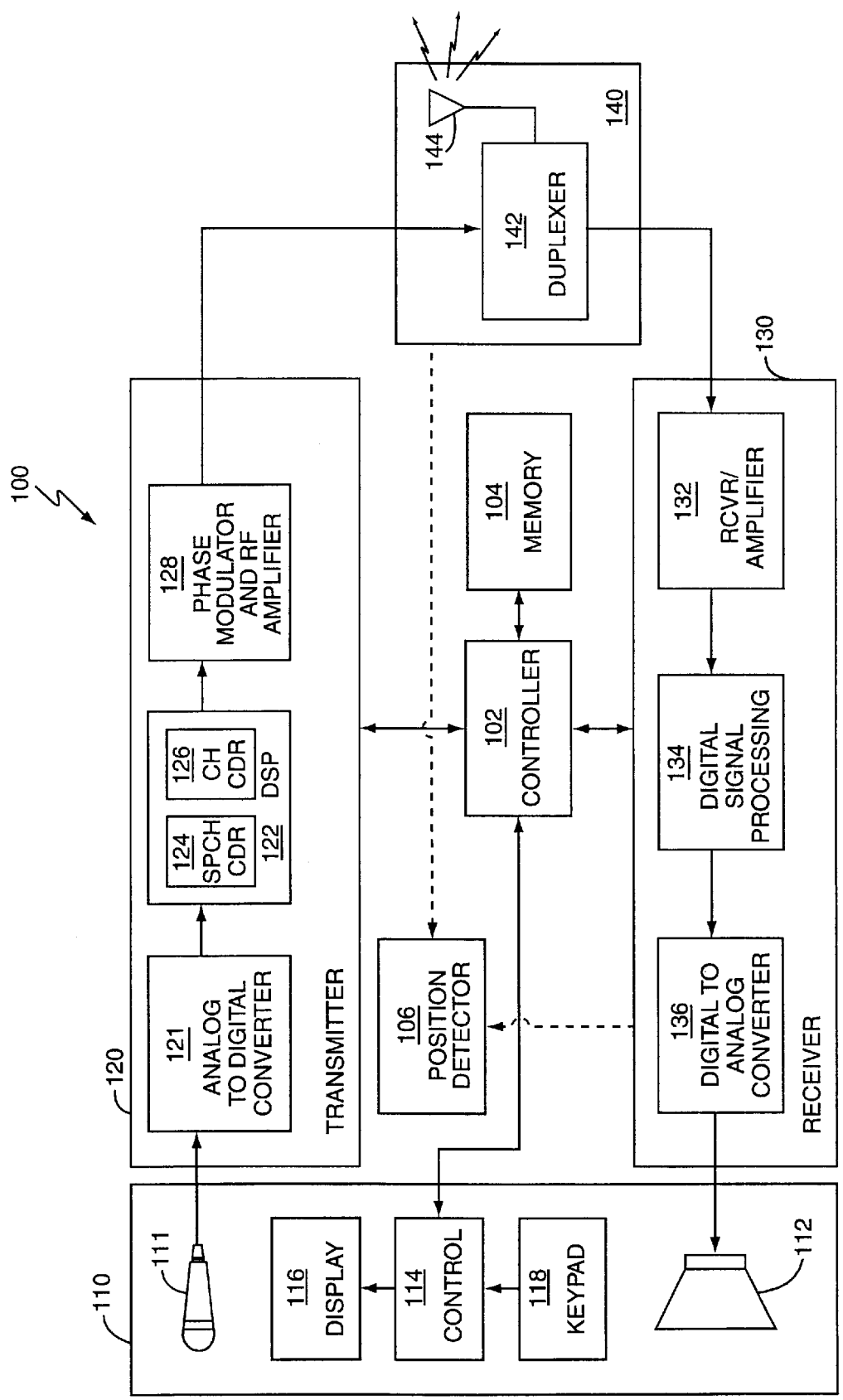
FIG. 6 is a diagram of a mobile terminal in accordance with the present invention.

FIG. 6 is a diagram of an exemplary implementation of the mobile terminal 100. The mobile terminal 100 includes a controller 102, memory 104, a position detector 106, an operator interface 110, a transmitter 120, a receiver 130, and an antenna assembly 140. The operator interface 110 typically includes a microphone 111, a speaker 112, an interface control 114, a display 116, and a keypad 118. The display 116 allows the operator to see dialed digits, call status, and other service information. The keypad 1118 allows the operator to dial numbers, enter commands, and select options. The interface control 114 interfaces the display 116 and the keypad 118 with the controller 102. The microphone 111 receives acoustic signals from the user and converts the acoustic signals to an analog electrical signal. The speaker 112 converts analog electrical signals from the receiver 130 to acoustic signals that can be heard by the user.

The analog electrical signal from the microphone 111 is supplied to the transmitter 120. Transmitter 120 includes an analog-to-digital converter (ADC) 121, a digital signal processor (DSP) 122, and a phase modulator and RF amplifier 128. The ADC 121 changes the analog electrical signal from the microphone 111 into a digital signal. The digital signal is passed to the DSP 122, which contains a speech coder 124 and channel coder 126. The speech coder 124 compresses the digital signal and the channel coder 126 inserts error detection, error correction and signaling information. The DSP 122 may include, or may work in conjunction with, a DTMF tone generator (not shown). The compressed and encoded signal from the DSP 122 is passed to the phase modulator and RF amplifier 128, which are shown as a combined unit in FIG. 2. The modulator portion converts the signal to a form that is suitable for transmission on an RF carrier. The RF amplifier portion then boosts the output of the modulator for transmission via the antenna assembly 140.

Receiver 130 includes a receiver/amplifier 132, a digital signal processor (DSP) 134, and a digital-to-analog converter (DAC) 136. Signals received by the antenna assembly 140 are passed to the receiver/amplifier 132, which shifts the frequency spectrum, and boosts the low-level RF signal to a level appropriate for conversion to a digital signal and subsequent input to the digital signal processor 134.

The DSP 134 typically includes an equalizer to compensate for phase and amplitude distortions in the channelcorrupted received signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data are passed to the controller 102. Speech data is processed by a speech decoder and passed to the DAC 136. The DAC 136 converts the speech data into an analog signal that is applied to the speaker 112 to generate acoustic signals that can be heard by the user. The DSP 134 may include, or may work in conjunction with, a DTMF tone detector (not shown). Note that the DSPs 122 and 134 might be implemented together in a single DSP device.

The antenna assembly 140 is connected to the RF amplifier portion of the phase modulator and RF amplifier 128 of the transmitter 120, and to the receiver/amplifier 132 of the receiver 130. The antenna assembly 140 typically includes a duplexer 142 and an antenna 144. The duplexer 142 permits full duplex communications over the antenna 144, as is commonly required in analog communication standards such as AMPS. The duplexer 142 might also be configured to provide transmit/receive switching between the transmitter 120 and receiver 130 when operating in the half-duplex modes common to digital communication standards such as TIA/EIA-136.

The controller 102 coordinates the operation of the transmitter 120 and the receiver 130, and may for instance take the form of a typical microprocessor (MPU) or microcontroller (MCU). This microprocessor may be a dedicated or shared microprocessor and may be a single processor or multiple parallel processors as needed or desired. Coordination functions include power control, channel selection, and timing, as well as a host of other functions known in the art. The controller 102 inserts signaling messages into the transmitted signals and extracts signaling messages from the received signals. The controller 102 responds to any base station commands contained in the signaling messages, and implements those commands. When the user enters commands via the keypad 118, the commands are transferred to the controller 102 for action. The memory 104 stores and supplies information at the direction of the controller 102 and preferably includes both volatile and non-volatile portions. In particular, memory 104 may be conventional RAM, low power battery backed RAM, or non-volatile storage such as Flash EPROM, disk file, EEPROM, and the like.

In addition to the above-described elements, the mobile terminal 100 may also include the position detector 106 in communication with the controller 102. Position detector 106 may have its own antenna (not shown) or may share the antenna 144. The position detector 106 may be compatible with the Global Positioning System (GPS), or other satellite navigation system, such as the Russian GLONASS system. Typically, the position detector 106 will output a geo-coordinate expressed as longitude and latitude coordinates corresponding to the present location of the mobile terminal 100. A geocoordinate may, with present civilian GPS systems, be accurate to within approximately 25 meters.

The position detector 106 may share selected portions of circuits with other mobile terminal functions. For example, the position detector 106 may use the antenna assembly 140, but includes its own receiver front end, typically a low-noise amplifier (LNA), which is not shown. Alternatively, the receiver/amplifier 132 may include provisions for receiving the satellites signals. In such configurations, the position detector 106 would receive satellite signal information from the receiver 130.

Note that the mobile terminal 100 might omit the position detector 106, or at least might not include a full implementation of the position detector 106. In a full implementation, the position detector 106 may comprise a complete GPS receiver. However, an abbreviated implementation may omit some elements associated with full demodulation of received satellite signals. This is possible in scenarios where the mobile terminal 100 is principally operated within digital service areas providing network-assisted GPS data and only enters analog service areas sporadically and for relatively short periods.

As earlier explained, with current position assistance data available stored in its memory 104, the mobile terminal need only synchronize with the GPS satellite signals to determine its location, rather than having to fully demodulated the received satellite signals to recover their embedded navigation message information. Whether fully or partially implemented, some or all of the functionality of the position detector 106 may be incorporated into other circuitry and software, such as in DSPs 122 and 134, or in the controller 102.

It should be appreciated that the term "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Thus, while the present discussion may be couched in terms of a phone, the present invention is equally applicable to these other sorts of devices. The previous discussion was by way of example, and not intended to be limiting on the definition of a mobile terminal.

As such, the present invention may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of expediting position determination in a dual-mode mobile terminal, the method comprising:

storing position assistance data in said mobile terminal to expedite position determination;

updating said stored position assistance data when operating in a digital service area by acquiring updated assistance information from a supporting communication network; and updating said stored position assistance data when operating in an analog service area by acquiring updated assistance information from supporting GPS satellites.

2. The method of claim 1 wherein updating said stored position assistance data when operating in said digital service area by acquiring said updated assistance information from said supporting communication network comprises:

predicting when said mobile terminal operating in a digital service area is likely to move into an analog service area; and updating said stored position assistance data based on said prediction.

3. The method of claim 2 wherein predicting when said mobile terminal operating in said digital service area is likely to move into said analog service area comprises recognizing in the supporting mobile network when said mobile terminal is operating in a fringe area of said digital service area bordering said analog service area.

4. The method of claim 2 wherein predicting when said mobile terminal operating in said current digital service area is likely to move into said analog service area comprises recognizing in said mobile terminal when said mobile terminal is operating in a fringe area of said current digital service area bordering said analog service area.

5. The method of claim 4 wherein recognizing in said mobile terminal when said mobile terminal is operating in a fringe area of said current digital service comprises identifying when at least one analog control channel becomes available.

6. The method of claim 5 wherein identifying when at least one analog control channel becomes available comprises identifying when said at least one analog control channel appears in a neighbor list of nearby base stations maintained in said mobile terminal.

7. The method of claim 1 wherein said updating said stored position assistance data when operating in said digital service area by acquiring updated assistance information from said supporting communication network comprises:
   maintaining aging values for individual components comprising said stored position assistance data; and
   updating selected ones of said individual components of said stored position assistance data based on said aging values.

8. The method of claim 7 wherein said maintaining said aging values for individual components comprising said stored position assistance data comprises:
   monitoring a time since a last download of a selected one of said individual components of said stored position assistance data; and
   downloading updated information for said selected one of said individual components of said stored position assistance data based on said time since last download.

9. The method of claim 1 further comprising periodically updating a reference location value of said mobile terminal based on said updated assistance information.

10. The method of claim 1 further comprising periodically updating a reference time value of said mobile terminal based on said updated assistance information.

11. The method of claim 1 further comprising determining a current location of said mobile terminal using said stored position assistance information to expedite satellite signal acquisition at an outset of an emergency call.

12. The method of claim 11 further comprising delaying activation of a transmitter in said mobile terminal at said outset of said emergency call while said mobile terminal is processing satellite signals from relevant ones of said supporting GPS satellites to determine said current position.

13. The method of claim 1 wherein updating said stored position assistance data when operating in said analog service area by acquiring said updated assistance information from said supporting GPS satellites comprises:
   identifying at least one GPS satellite expected to be available sometime within a defined window of time;
   monitoring for a signal from said at least one GPS satellite during said defined window of time;
   downloading satellite information from each of said at least one GPS satellites when said signal becomes available; and
   updating said stored position assistance data based on said downloaded satellite information.

14. The method of claim 13 wherein downloading satellite information from each of said at least one GPS satellites when said signal becomes available comprises downloading at least one of two data items, said two data items comprising, for each said GPS satellite that becomes available, clock correction data and ephemeris data.

15. The method of claim 1 wherein said updated assistance information comprises new information for at least some of the data comprising said stored position assistance data, and wherein updating said stored position assistance data when operating in a digital service area by acquiring updated assistance information from a supporting communication network comprises periodically receiving said updated assistance information from said supporting communication network.

16. The method of claim 1 wherein updating said stored position assistance data when operating in an analog service area by acquiring updated assistance information from supporting GPS satellites comprises periodically receiving satellite information from at least one currently available GPS satellite.

17. A mobile terminal comprising:
   a user interface to generate output information for a user, and to receive input information from the user;
   a transmitter to transmit a transmit signal to a remote base station, said transmit signal containing data derived from said input information;
   a receiver to receive a received signal from said remote base station, said received signal containing data used to generate said output information; and
   a position detector comprising:
      a satellite signal receiver to receive at least one satellite signal from a supporting position assistance satellite; and
      processing logic to:
         store position assistance data in said mobile terminal to expedite position determination;
         update said stored position assistance data when operating in a digital service area by acquiring updated assistance information from a supporting communication network via said transmitter; and
         update said stored position assistance data when operating in an analog service area by acquiring updated assistance information from supporting GPS satellites via said satellite signal receiver.

18. The mobile terminal of claim 17 further comprising memory associated with said processing logic to hold said stored position assistance data.

19. The mobile terminal of claim 17 further comprising a system processor to coordinate operations of said mobile terminal, including coordinating operation of said user interface, said transmitter, said receiver, and said position detector.

20. The mobile terminal of claim 17 further comprising a signal processor to process said at least one satellite signal.

21. The mobile terminal of claim 17 wherein at least a portion of said processing logic comprises a system processor.

22. The mobile terminal of claim 21 wherein said system processor comprises logic to predict when said mobile terminal is likely to leave a digital service area and enter an analog service area.

23. The mobile terminal of claim 22 wherein said system processor further comprises logic to request said updated assistance information from said supporting communication network based on said predicting when said mobile terminal is likely to leave said digital service area.

24. The mobile terminal of claim 21 wherein said system processor comprises logic to maintain aging values for selected portions of said stored position assistance data.

25. The mobile terminal of claim 24 wherein said system processor further comprises logic to selectively update portions of said stored position assistance data based on corresponding ones of said aging values.

26. The mobile terminal of claim 25 wherein said system processor further comprises logic to selectively reset said aging values based on updating corresponding portion of said stored position assistance data.

27. The mobile terminal of claim 17 further comprising a system processor to periodically update selected portions of said stored position assistance data based on periodically receiving said at least one satellite signal via said position detector.

28. The mobile terminal of claim 17 wherein said position detector comprises a GPS receiver.

29. The mobile terminal of claim 17 wherein said input information is input speech signals from the user and said output information is output speech signals recovered from said received signal, and wherein said user interface comprises:

a microphone to generate the input speech signals based on voice input from the user; and a speaker to output an audio signal corresponding to the output speech signals recovered from said received signal.

* * * * *